May 22, 1934.     O. E. ANDRUS     1,960,042
SECURING PROTECTIVE COVERINGS TO METALLIC SURFACES
Filed June 18, 1930
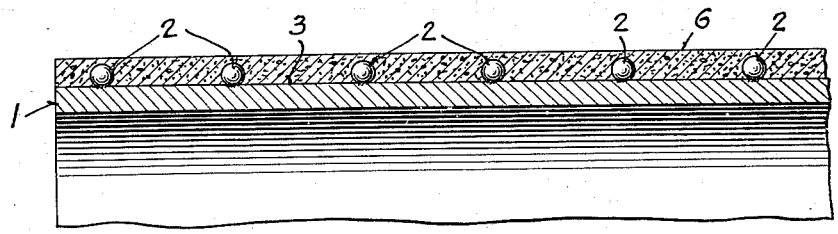
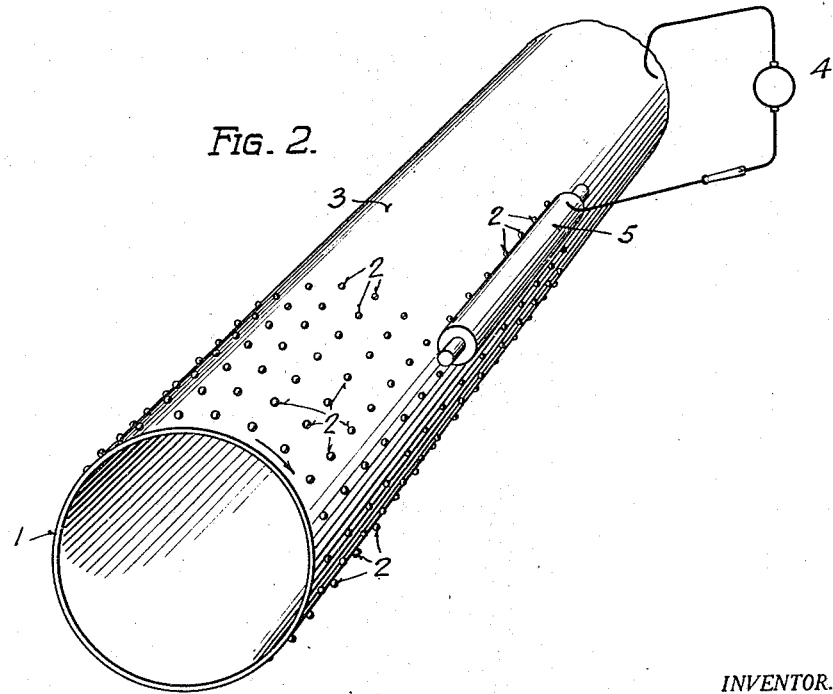
INVENTOR.
Orrin E. Andrus
BY
ATTORNEY.

Patented May 22, 1934

1,960,042

UNITED STATES PATENT OFFICE 1,960,042

SECURING PROTECTIVE COVERING TO METALLIC SURFACES

Orrin E. Andrus, Wauwatosa, Wis., assignor to A. O. Smith Corporation, Milwaukee, Wis., a corporation of New York Application June 18, 1930, Serial No. 462,063

1 Claim. (Cl. 137—75)

This invention relates to a method of securing coatings or coverings to metallic surfaces and more particularly to securing protective coverings to underground pipe lines.

An object of the invention is to provide a method of securing protective coverings to metallic surfaces.

Another object of the invention is to provide a method of securing coverings to pipes which prevents creeping and sagging of the covering.

Another object is to provide a metal pipe or surface with a coating or covering which is reenforced and strengthened and which is fastened to the pipe by novel means.

A further object is to provide a more efficient, rapid, and economical method of securing coverings to pipes.

The invention resides in securing metallic pellets, and the like, at intervals to the surface of the metal to be coated, as by resistance welding, and thereafter covering the same with the desired coating material.

The invention will be best understood by referring to the preferred embodiment thereof as illustrated in the accompanying drawing in which:

Figure 1 is a longitudinal sectional view of a pipe upon which a coating is secured in accordance with the present invention.

Fig. 2 is a perspective view of one end of a pipe, to the outer surface of which are welded a plurality of metallic spheres or the like, preparatory for the coating operation.

The laying and maintenance of underground pipe lines is attended with numerous difficulties. Among these is the tendency for the pipe to corrode.

Corrosion may be caused by a soil condition which operates externally to destroy the metal of the pipe, and to so weaken the pipe in time that it fails at the pressures to which it is subjected.

Many types of coatings have been devised to prevent corrosion. While these coatings do inhibit corrosive tendencies under certain conditions, many of them fail because of two intervening conditions known in the field as "creeping" or "stripping" and "sagging".

Temperature changes with the resultant expansion and contraction of the pipe line and the earth's crust cause the pipe to be in constant sliding friction with the soil. The pipe expands longitudinally as well as radially. This has a tendency to cause the coating to be stripped from the pipe or to sag and expose the pipe to corrosive agents.

The pipe 1 to be coated is preferably of sheet metal which is rolled into tubular form, and welded into a seamless structure.

In carrying out the present invention, small metallic pellets 2, preferably spheres of suitable alloy corrosion resisting metal, are welded to the exterior surface 3 of the pipe 1 at frequent intervals. This is preferably accomplished by resistance welding in which one terminal of a source of power 4 is attached to the tubular member 1 to be coated while electrical contact from the other terminal is established through each of the spheres to be welded by suitable means, such as a roller electrode 5. The pipe 1 may be rotated and the spherical pellets 2 dropped between the roller electrode 5 and the pipe.

The resistance at the point of contact between the pellets 2 and the pipe 1 will cause the parts to be raised to a welding temperature and the pellets to be welded to the surface 3 of the pipe.

A suitable embodiment of the present invention may employ pellets of a spherical shape which are from $\frac{1}{16}$ to $\frac{1}{8}$ inch in diameter. The distribution of pellets over the surface of the pipe is subject to variations. Where the coating has high intrinsic strength and good adhesive qualities, the pellets may be spread farther apart than for other coatings. For ordinary protective coatings, the pellets may be distributed at intervals of about $\frac{1}{2}$ inch. In general it has been found desirable to provide pellets having a diameter approximately equal to the thickness of the coating to be applied.

The application of the pellets to the surface of the pipe by resistance welding causes said pellets to change their shape somewhat. The heat generated by the electric current and the pressure applied thereafter to effect the welding operation usually causes the pellets to flatten. Although the spherical shaped pellet has been found to be most practical for reasons involved in welding the same to the pipe, various forms may be used within the spirit and scope of the present invention. The spherical shape is also desirable since it effects a more efficient reenforcement of the covering, and since it has no sharp corners, it causes no cracks or clefts to form in the protective coating.

After the pipe 1 has been covered at frequent intervals with the pellets 2, it is ready for coating with a protective coating 6 of cement, or suitable mastic or bituminous materials. The method of applying the coatings varies, of course, with the coating to be applied. Bituminous coatings are usually applied hot while cement may be sprayed on cold. However, the manner of application of the protective coating is not a part of the present invention.

The method of coating may be applied in protecting the inside of pipes or tanks or vessels subject to corrosion. It is likewise applicable to the protection of metallic surfaces from wear as well as corrosion.

While the invention has been specifically set forth, various embodiments may be employed within the scope of the following claim.

I claim:

A coated metal article having means for anchoring the coating thereon comprising a plurality of metal balls welded at distributed points over the surface thereof and providing undercut surfaces for anchoring the coating material.

ORRIN E. ANDRUS.